(12) United States Patent
Sun (10) Patent No.: US 9,671,644 B2
(45) Date of Patent: Jun. 6, 2017

(54) DIRECT BACKLIGHT MODULE AND LIQUID CRYSTAL DISPLAY DEVICE

(71) Applicant: BOE TECHNOLOGY GROUP CO., LTD., Beijing (CN)

(72) Inventor: Yanliu Sun, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 621 days.

(21) Appl. No.: 14/236,213

(22) PCT Filed: Nov. 5, 2013

(86) PCT No.: PCT/CN2013/086544
§ 371 (c)(1),
(2) Date: Jan. 30, 2014

(87) PCT Pub. No.: WO2014/176885
PCT Pub. Date: Nov. 6, 2014

(65) Prior Publication Data
US 2016/0252776 A1  Sep. 1, 2016

(30) Foreign Application Priority Data
Apr. 28, 2013 (CN) .......................... 2013 1 0155794

(51) Int. Cl.
G02F 1/1335 (2006.01)

(52) U.S. Cl.
CPC .. G02F 1/133606 (2013.01); G02F 1/133603 (2013.01); *G02F 2001/133607* (2013.01)

(58) Field of Classification Search
CPC ......... G02F 1/133606; G02F 1/133603; G02F 2001/133607
See application file for complete search history.

(56) References Cited

U.S. PATENT DOCUMENTS 8,482,679 B2 * 7/2013 Kasai ................ G02F 1/133603
348/790
2008/0158875 A1 7/2008 Kim et al.

FOREIGN PATENT DOCUMENTS

CN 101211064 A 7/2008
CN 103032817 A 4/2013
(Continued)

OTHER PUBLICATIONS

International Search Report mailed Feb. 13, 2014; PCT/CN2013/086544.
(Continued)

*Primary Examiner* — Stephen F Husar
(74) *Attorney, Agent, or Firm* — Ladas & Parry LLP (57) ABSTRACT

A direct backlight module and LCD device are provided. The direct backlight module includes a back plate, a backlight source mounted on the back plate, and a plurality of double lens structures mounted on the back plate and over the backlight source, the backlight source includes a plurality of LED bars, wherein the double lens structures are axisymmetrical and correspond to the LED bars, respectively, and each of the double lens structure has an axis coincides with that of the corresponding LED bar. The backlight module according to the embodiments of the present invention can improve the light efficiency of the backlight module and reduce the number of the LEDs used, and a slim design for backlight module is obtained.

19 Claims, 5 Drawing Sheets

(56) References Cited

FOREIGN PATENT DOCUMENTS

| CN | 103244871 A | 8/2013 |
|---|---|---|
| JP | 2008-034321 A | 2/2008 |

OTHER PUBLICATIONS

International Preliminary report on Patentability Appln. No. PCT/CN2013/086544; Dated Nov. 3, 2015.
First Chinese Office Action Appln. No. 201310155794.4; Dated Sep. 29, 2014.

\* cited by examiner

Fig. 9

DIRECT BACKLIGHT MODULE AND LIQUID CRYSTAL DISPLAY DEVICE

TECHNICAL FIELD

Embodiments of the present invention relate to a direct backlight module and a liquid crystal display device.

BACKGROUND

With the rapid development of display technology, liquid crystal display devices (such as a liquid crystal TV, a liquid crystal display, a liquid crystal display panel) are widely used in production and human life due to its low voltage driven, flat panel structure, more information displayed, easily colorized, durability, less radiation and pollution.

However, a liquid crystal display (LCD) device is a passive display device, and it is required to modulate external light to display as it can not emit light itself. With the continuously increasing area of the liquid crystal display panel, side light type can not meet the requirement of the liquid crystal display device any longer, because its backlight module is limited by optical path and so on. A direct backlight module is more suitable for a big size LCD device due to its flexible lamps configuration and control, and so on. However, the direct backlight module generally has a great thickness and needs numerous of light emitting diodes (LED), which increases the cost for the LCD device.

SUMMARY

Embodiments of the present invention provide a direct backlight module, comprising: a back plate, a backlight source mounted on the back plate, and a plurality of double lens structures mounted on the back plate and over the backlight source, the backlight source including a plurality of LED bars, wherein the double lens structures are axisymmetrical and correspond to the LED bars, respectively, and each of the double lens structure has an axis coincides with that of the corresponding LED bar.

In one example, each of the double lens structure comprises a first refraction structure, a second refraction structure disposed opposite to and below the first refraction structure, and an inner cavity formed between the first refraction structure and the second refraction structure, and the first refraction structure has an axis coincides with that of the second refraction structure.

In one example, the first refraction structure has a bottom surface being a light exiting surface, the second refraction structure has a bottom surface being a light incidence surface, the light exiting surface and the light incidence surface are circular flat planes, and the light incidence surface has an area smaller than that of the light exiting surface.

In one example, the top surface of the first refraction structure is a spherical surface, a cambered surface or a conical surface, and the top surface of the second refraction structure is a spherical surface, a cambered surface or a conical surface.

In one example, the double lens structures are mounted on the back plate via a plurality of support legs, and satisfy a relation that H is greater than H3 and less than 4/3*H3, where H is the height of the support leg and H3 is the thickness of the LED bars.

In one example, the diameter of the light incidence surface L2 is no less than 1.5 times of L3 which is the length of LED bars.

In one example, the light incidence surface has a diameter L2 and the LED bar has a length L3, and L2 is no less than 1.5 times of L3.

In one example, if the top surface of the first refraction structure is a conical surface and the conical surface has a cone angle $\Phi$ in a range of 120° to 165°.

In one example, the first refraction structure has a refraction index no greater than that of the second refraction structure.

In one example, the first refraction structure and the second refraction structure are made of optical glass or organic transparent glass.

In one example, if the top surface of the second refraction structure is a spherical surface, the spherical surface has a radius R no less than 5 times of H3 and no greater than 10 times of H3, where H3 is the thickness of the LED bars.

Embodiments of the present invention also provide a liquid crystal display device comprising the direct backlight module as the described.

BRIEF DESCRIPTION OF THE DRAWINGS

Embodiments of the present invention will be described in detail hereinafter in conjunction with accompanying drawings to allow one of ordinary skill in the art to understand the present invention more clearly, in which.

| Reference Signs | |
|---|---|
| 11-LED bar | 12-second refraction structure |
| 13-inner cavity | 14-first refraction structure |
| 15-light | 16-support leg |
| 17, 45-double lens structure | |
| 21-light distribution curve of a conventional direct backlight module | |
| 31, 42-light distribution curve of direct backlight module according to embodiments of the present invention | |
| 41-LED bar | |
| 43-receiving surface of mixing height H1 | |
| 44-uneven light distribution | |
| 46-light distribution of heart-shape | |
| 47-even light distribution | |

DETAILED DESCRIPTION

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments and variants can be obtained by those of ordinary skill in the art without creative labor and those embodiments and variants shall fall into the protection scope of the present invention.

Unless otherwise defined, all the terminologies used herein have the same meanings as commonly understood by one of ordinary skill in the art to which the present invention belongs. The terms "first," "second," etc., which are used in the description and the claims of the present application, are not intended to indicate any sequence, amount or importance, but for distinguishing various components. Also, the terms such as "a/an," "one," or "the" etc., are not intended to limit the amount, but for indicating the existence of at lease one. The terms "comprise/comprising," "include/including," etc., are intended to specify that the elements or the objects stated before these terms encompass the elements or the objects and equivalents thereof listed after these terms, but not preclude other elements or objects. "On," "above," "under," "below" and the like are only used to indicate relative position relationship, and when the position of the object which is described is changed, the relative position relationship may be changed accordingly.

Embodiments of the present invention provide a direct backlight module and a LCD device, where the light efficiency of the backlight module is increased, the number of the LEDs is decreased, and the light-mixing height of the direct backlight module is reduced. Thus, a slim design for backlight module is obtained.

Figure 1:
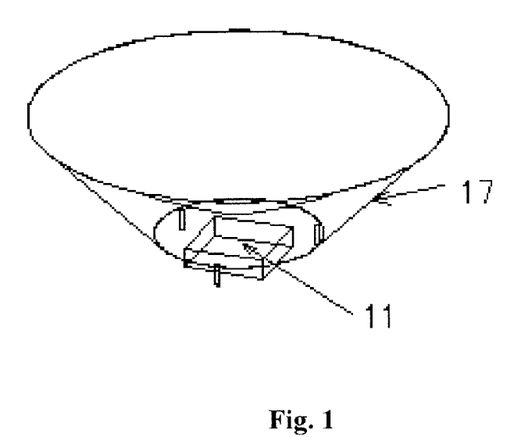
FIG. 1 is a schematic stereo diagram of a direct backlight module according to an embodiment of the present invention.

FIG. 1 is a schematic structure diagram of a direct backlight module according to an embodiment of the present invention. As illustrated in FIG. 1, the direct backlight module includes a back plate, a backlight source mounted on the back plate, and a plurality of double lens structures 17 mounted on the back plate and over the backlight source, the backlight source includes a plurality of LED bars 11, wherein the double lens structures 17 are axisymmetrical and correspond to the LED bars 11, respectively, and each of the double lens structure 17 has an axis coincides with that of the corresponding LED bar 11.

Figure 2:
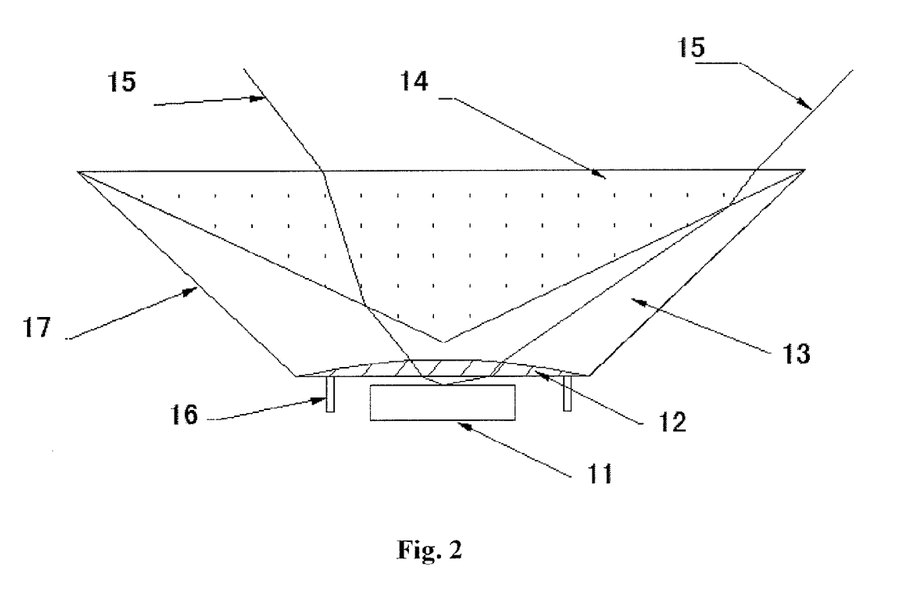
FIG. 2 is a schematic sectional view of a direct backlight module according to an embodiment of the present invention.

According to an embodiment of the present invention, as illustrated in FIG. 2, the double lens structure 17 includes a first refraction structure 14 and a second refraction structure 12 disposed opposite to and below the first refraction structure 14, an inner cavity 13 formed between the first refraction structure 14 and the second refraction structure 12, and the first refraction structure 14 has an axis coincides with that of the second refraction structure 12.

The bottom surface of the first refraction structure 14 is a light exiting surface, and the bottom surface of the second refraction structure 12 is a light incidence surface. Both the light incidence surface and the light exiting surface are circular planes, and the light incidence surface has an area less than that of the light exiting surface.

Both the top surface of the first refraction structure 14 and the top surface of the second refraction structure 12 are in curved profiles.

For example, the top surface of the first refraction structure 14 can be a spherical surface, a cambered surface or a conical surface, and the top surface of the second refraction structure 12 can be a spherical surface, a cambered surface or a conical surface.

Figure 3:
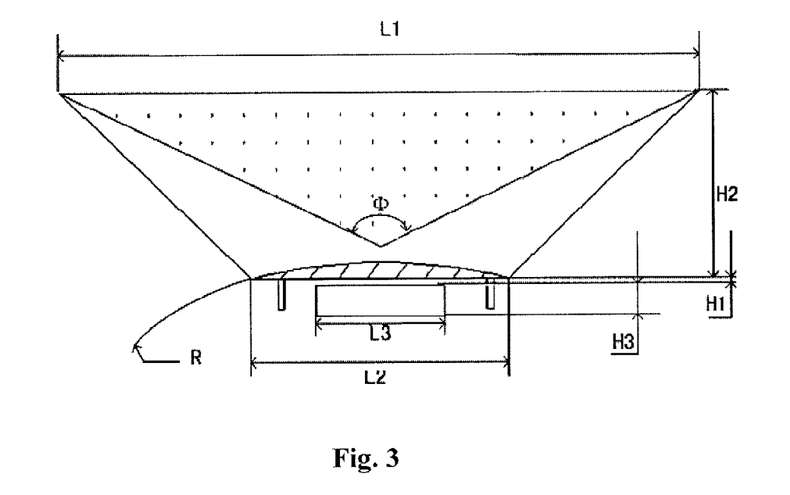
FIG. 3 is another schematic sectional view of the direct backlight module according to an embodiment of the present invention.

As illustrated in FIG. 2 and FIG. 3, the double lens structure 17 is mounted on the back plate via a plurality of support legs 16. So, the height of the support leg H should be greater than the thickness H3 of the LED bar, i.e., H>H3. Furthermore, in order to obtain a slim design for backlight module, the height of the support leg 16 may not be too high. So, the height of the support leg 16 can be less than 4/3*H3, for example.

Referring to FIG. 3 again, the bottom surface of the first refraction structure 14 has a diameter L1, the bottom surface of the second refraction structure 12 has a diameter L2 and the LED bar 11 has a width L3. In an embodiment of the present invention, L2 and L3 can satisfy a relation of L2≥1.5*L3, for example. If L2 is set too small, lights emitted from the LED bars 11 with a great angle can not be captured by the bottom portion of the second refraction structure 12. Additionally, L2 may not be set too big. If L2 is set too big, L1 has to be big accordingly, and the overall size of the double lens structure 17 will be oversized, which will increase the production cost of the backlight module, and the slim design of the backlight module will be affected.

L1 and L2 can satisfy relation: 2*L2≤L1≤5*L2. If L1 is set excessively big, it tends to allow the size of the double refraction structure 17 to be excessively great, which can increase the cost accordingly. If L1 is set excessively small, it tends to allow the outside light passing through the second refraction structure 12 to leave out of the margin of the first refraction structure 14, so that the first refraction structure 14 cannot play a role in it.

Additionally, if the first refraction structure 14 is a cone, the cone angle Φ of the first refraction structure 14 can be designed as no less than 120° and no greater than 160° (120°≤Φ≤160°). If Φ is set too great, the first refraction structure 14 tends to be a flat plate, its function for diverging light will be weaken. If Φ is set too small, the height H2 of the double lens structure will be increased and the slim design of the backlight module will be affected.

In order to increase amplitude of diverging light by the first refraction structure 14, for example, the refraction index of the first refraction structure 14 is no greater than refraction index of the second refraction structure 12. The first refraction structure 14 and the second refraction structure 12 can be made of optical glass or organic transparent glass, for example.

Referring to FIG. 2 again, after light 15 is emitted from the LED bar 11, the second refraction structure 12 begins to collect light and collect the light to a direction in which the light can be emerged by single transmission. Thus the Fresnel loss due to multiple reflections at an upper and a bottom surface of the inner cavity caused by greater optical diverging angle can be avoided, and luminous efficiency is improved.

Figure 4:
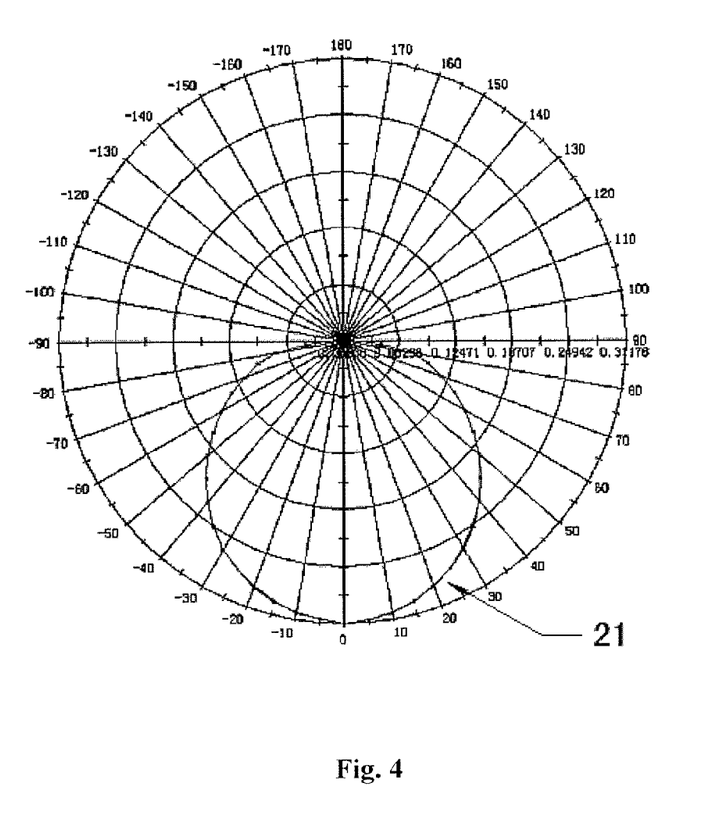
FIG. 4 is a schematic diagram of light distribution of a conventional direct backlight module.
Figure 5:
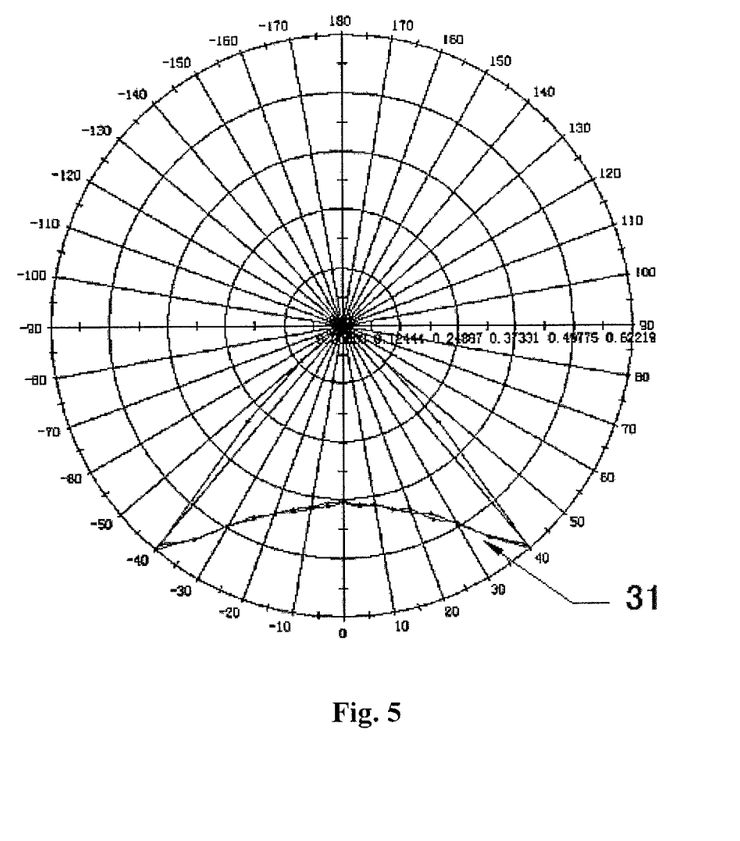
FIG. 5 is a schematic diagram of light distribution of a direct backlight module according to an embodiment of the present invention.

As illustrated in FIGS. 2, 4 and 5, light 15 passing through the second refraction structure 12 will be re-modulated when it passes through the first refraction structure 14. The distribution of the light 15 changes from original near Lambertian distribution or near Gaussian distribution 21 to distribution of heart-shape 31.

Figure 6:
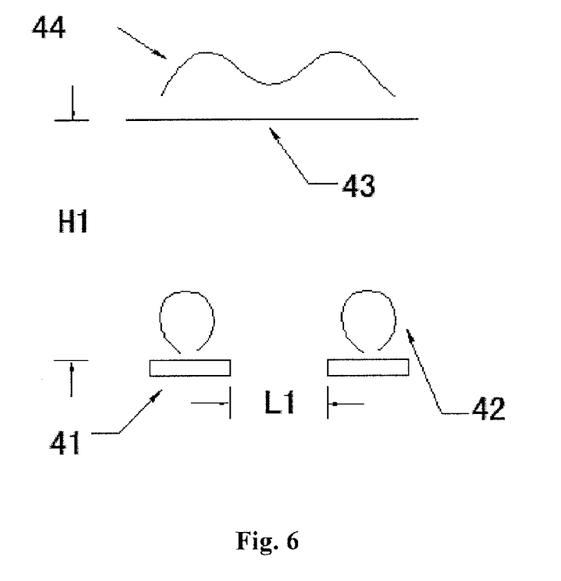
FIG. 6 is a schematic diagram of distribution of LED bars in a conventional direct backlight module.
Figure 7:
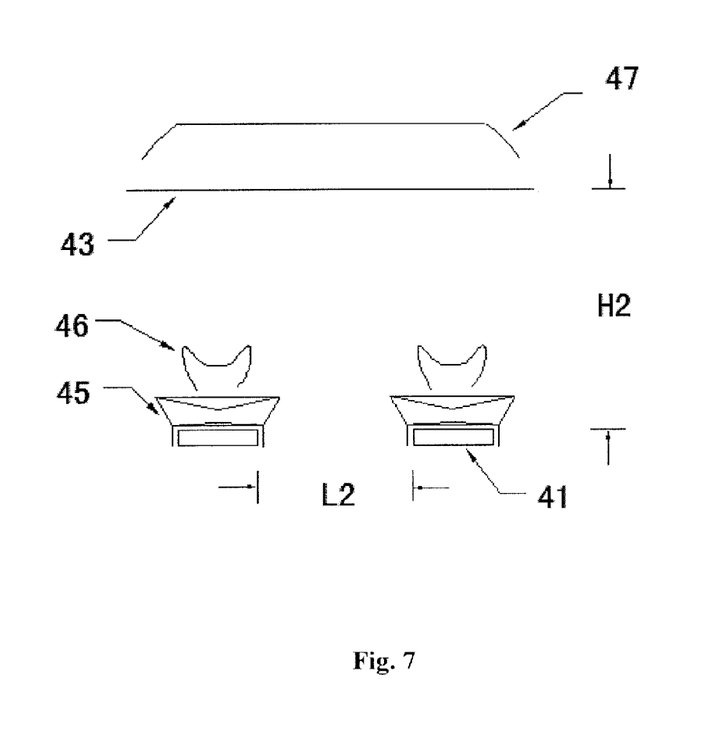
FIG. 7 is a schematic diagram of distribution of LED bars and a double lens structure in a direct backlight module according to an embodiment of the present invention.

As illustrated in FIG. 6, in a conventional backlight module, two LED bars 41 with a distance L1 therebetween emit two sets of distribution of light 42 which will form a uneven light distribution 44 on the receiving surface 43 of the light-mixing height H1. Thus, an even distribution of light can be formed only by increasing the light-mixing height or decreasing the distance between LED bars. However, as illustrated in FIG. 7, if a double lens structure 45 is disposed over the LED bars 41, which will emit two sets of light of heart-shape distribution 46. Thus, an even distribution of light 47 is formed at the light receiving surface 43 with same light-mixing height (H2=H1) as illustrated in FIG. 6. Thus, the light-mixing height is reduced and the distance between LED bars is increased, such that the number of the LEDs used in the backlight module is reduced and the cost of the LCD device will be decreased.

The direct backlight module according to embodiments of the present invention will be described in detail in connection with exemplary embodiments hereinafter.

Embodiment 1

In this embodiment, the width of LED bar 11 is L3 and the thickness of the LED bar 11 is H3; the diameter of the first refraction structure 14 is L1, the diameter of the second refraction structure 12 is L2; the height difference between the support leg 16 and LED bar 11 is H1, the height of the double lens structure 17 is H2. The first refraction structure 14 is a cone with a cone angle Φ, and the second refraction structure 12 has a shape of arc ball with curvature radius R. Both the first refraction structure 14 and the second refraction structure 12 are made of optical glass BK7. The parameters mentioned above satisfy the following requirements:

L1=2.5*L2, L2=1.8*L3, H1=0.2*H3, the cone angle Φ=135°, R=5*H3, and H2 is determined upon L1, L2, Φ and R.

As illustrated in FIG. 4, the light distribution of LED bar in a conventional backlight module is a Lambertian distribution, with angle of largest light intensity at 0°.

As illustrated in FIG. 5, after modulated by the described double lens structure 17, the distribution of light changes to a distribution of heart-shape, with angle of largest light intensity at ±40°. Thus, the luminous efficiency of LED bars is improved.

A double lens structure is placed over the LED bars on the bottom of the direct backlight module in the present embodiment, such that the light-mixing height of the backlight module is reduced. Thus, the power consumption and the light-mixing height of the backlight module are decreased, which facilitates a slim design of the backlight module. And moreover, the luminous efficiency of the backlight module can be improved such that the number of the LEDs used in the backlight module can be reduced and the cost is lowered.

Embodiment 2

In this embodiment, the width of LED bar 11 is L3 and the thickness of the LED bar 11 is H3; the diameter of the first refraction structure 14 is L1, the diameter of the second refraction structure 12 is L2; the height difference between the support leg 16 and LED bar 11 is H1, the height of the double lens structure 17 is H2. The first refraction structure 14 is a cone with a cone angle Φ, and second refraction structure 12 has a shape of arc ball with curvature radius R. The first refraction structure 14 and the second refraction structure 12 are made of optical glass BK7. The parameters mentioned above satisfy the following requirements:

L1=2*L2, L2=1.5*L3, H1=0.2*H3, the cone angle Θ=135°, R=5*H3, and H2 is determined upon L1, L2, Φ and R.

Figure 8:
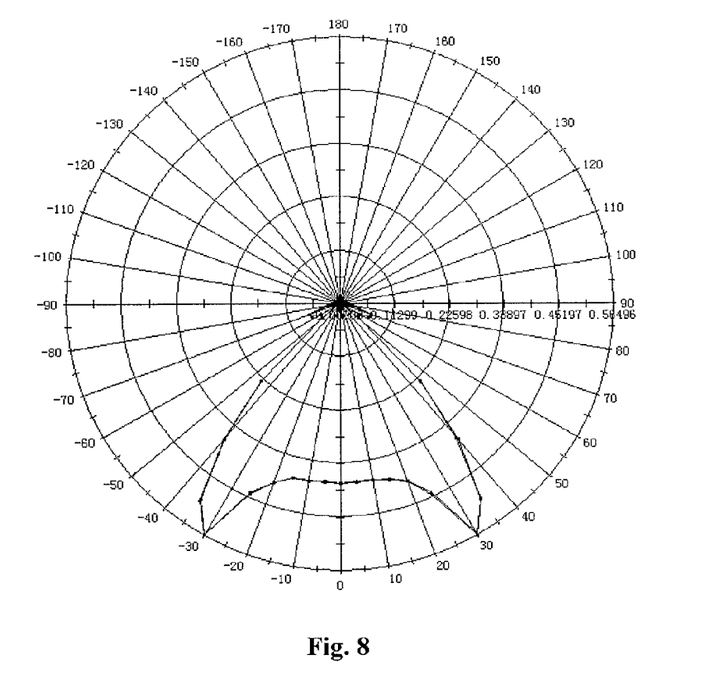
FIG. 8 is a schematic diagram of light distribution of a direct backlight module according to another embodiment of the present invention.

It can be seen from FIG. 8 that light emitted by LED bars with great angles will not be captured by the second refraction structure 12 if L1 and L2 are at their extremely limits, such that furcations appear in two directions at the bottom of the light distribution diagram. Since light emitted with great angles by the LED bars is not captured by the second refraction structure 12, the light with great angles is not diverged by the first refraction structure 14, such that the angle of the largest light intensity will also be decreased. Even so, its angle of the largest light intensity is greater than that of the conventional largest light intensity 0°.

Thus, if setting the parameter L2 bigger than 1.5 times of L3 (L2>1.5*L3) and L1 bigger than 2 times of L2 (L1>2*L2), a better effect can be obtained.

Embodiment 3

In this embodiment, the width of LED bar 11 is L3 and the thickness of the LED bar 11 is H3; the diameter of the first refraction structure 14 is L1, the diameter of the second refraction structure 12 is L2; the height difference between the support leg 16 and LED bar 11 is H1, the height of the double lens structure 17 is H2. The first refraction structure 14 is a cone with a cone angle Φ, and the second refraction structure 12 has a shape of arc ball with curvature radius R. Both the first refraction structure 14 and the second refraction structure 12 are made of optical glass BK7. The parameters mentioned above satisfy the following requirements:

L1=2.5*L2, L2=1.8*L3, H1=0.2*H3, the cone angle Φ=160°, R=5*H3, and H2 is determined upon L1, L2, Φ and R.

Figure 9:
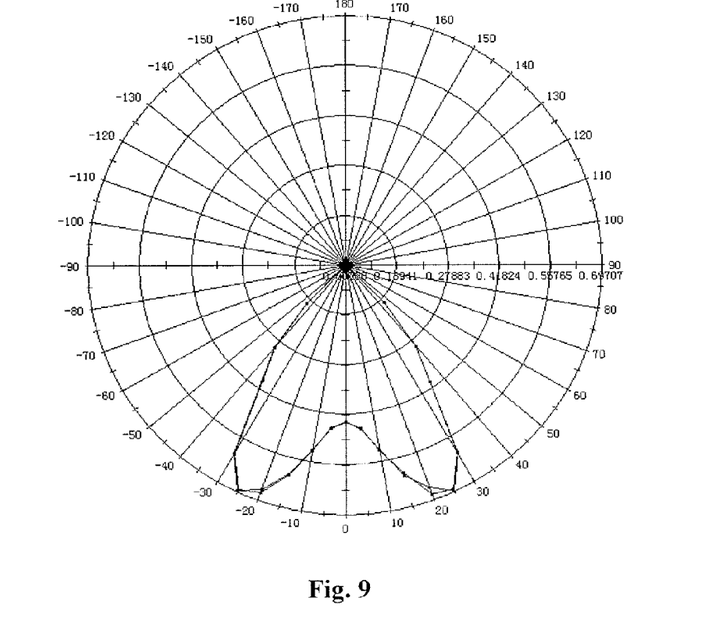
FIG. 9 a schematic diagram of light distribution of a direct backlight module according to yet another embodiment of the present invention.

It can be seen from FIG. 9 that, if the cone angle of the first refraction structure is set at its allowable greatest value and other parameters are the same as those in Embodiment 1, the modulating to the light distribution by the first refraction structure is significantly weaken, such that the angle of largest light intensify is greatly reduced. Even so, its angle of the largest light intensity is greater than the angle of the conventional largest light intensity 0°.

So, when setting parameters of the double lens structure, the cone angle Φ may be set as small as possible if allowable.

In the technical solutions and exemplary embodiments of the present invention described above, for a direct backlight module, a double lens structure is placed over LED bars on its bottom so that the light-mixing height of the backlight module is reduced, the power consumption of the backlight module and the light-mixing distance are reduced and the luminous efficiency of the backlight module is improved. Thus, the number of LEDs used in the backlight module is decreased and the cost is reduced, and a slim design of a backlight module is achieved.

Embodiments of the present invention also provide a LCD device, which includes the direct backlight module as described above. The LCD device can be an LCD panel, an electronic paper, an LCD TV, a LCD, a digital frame, a cell phone, a tablet PC, and the like The described embodiments are merely exemplary embodiments of the invention, but not intended to limit the protection scope of the invention. It is understood that the embodiments of the present invention can be modified or varied in many ways by an ordinary skill in the art without departure from the spirit and scope of the invention, and all such modifications and variants and the equivalents thereof are intended to fall into the scope of the appended claims.

What is claimed is:

1. A direct backlight module, comprising: a back plate, a backlight source mounted on the back plate, and a plurality of double lens structures mounted on the back plate and over the backlight source, the backlight source including a plurality of LED bars, wherein the double lens structures are axisymmetrical and correspond to the LED bars, respectively, and each of the double lens structures has an axis coincides with that of the corresponding LED bar, wherein each of the double lens structures includes a first refraction structure, a second refraction structure disposed opposite to and below the first refraction structure, and an inner cavity formed between the first refraction structure and the second refraction structure, and the first refraction structure has an axis coincides with that of the second refraction structure, and wherein the first refraction structure has a bottom surface being a light exiting surface, the second refraction structure has a bottom surface being a light incidence surface, the light exiting surface and the light incidence surface are circular flat planes, and the light incidence surface has an area smaller than that of the light exiting surface.

2. The direct backlight module according to claim 1, wherein both the first refraction structure and the second refraction structure have top surfaces in curved profiles.

3. The direct backlight module according to claim 1, wherein the top surface of the first refraction structure is a spherical surface, a cambered surface or a conical surface, and the top surface of the second refraction structure is a spherical surface, a cambered surface or a conical surface.

4. The direct backlight module according to claim 1, wherein the double lens structures are mounted on the back plate via a plurality of support legs, and satisfy a relation that H is greater than H3 and less than 4/3*H3, where H is the height of the support leg and H3 is the thickness of the LED bar.

5. The direct backlight module according to claim 1, wherein the light incidence surface has a diameter L2 and the LED bar has a length L3, and L2 is no less than 1.5 times of L3.

6. The direct backlight module according to claim 5, wherein the light exiting surface has a diameter L1 no less than 2 times of L2 and no greater than 5 times of L2.

7. The direct backlight module according to claim 1, wherein the top surface of the first refraction structure is a conical surface and the conical surface has a cone angle CD in a range of 120° to 165°.

8. The direct backlight module according to claim 1, wherein the first refraction structure has a refraction index no greater than that of the second refraction structure.

9. The direct backlight module according to claim 1, wherein the first refraction structure and the second refraction structure are made of optical glass or organic transparent glass.

10. The direct backlight module according to claim 1, wherein the top surface of the second refraction structure is a spherical surface, the spherical surface has a radius R no less than 5 times of H3 and no greater than 10 times of H3, where H3 is the thickness of the LED bar.

11. A liquid crystal display device comprising the direct backlight module according to claim 1.

12. The direct backlight module according to claim 2, wherein the top surface of the first refraction structure is a spherical surface, a cambered surface or a conical surface, and the top surface of the second refraction structure is a spherical surface, a cambered surface or a conical surface.

13. The direct backlight module according to claim 2, wherein the double lens structures are mounted on the back plate via a plurality of support legs, and satisfy a relation that H is greater than H3 and less than 4/3*H3, where H is the height of the support leg and H3 is the thickness of the LED bar.

14. A direct backlight module, comprising: a back plate, a backlight source mounted on the back plate, and a plurality of double lens structures mounted on the back plate and over the backlight source, the backlight source including a plurality of LED bars, wherein the double lens structures are axisymmetrical and correspond to the LED bars, respectively, and each of the double lens structures has an axis coincides with that of the corresponding LED bar, wherein each of the double lens structures includes a first refraction structure, a second refraction structure disposed opposite to and below the first refraction structure, and an inner cavity formed between the first refraction structure and the second refraction structure, and the first refraction structure has an axis coincides with that of the second refraction structure.

15. The direct backlight module according to claim 14, wherein both the first refraction structure and the second refraction structure have top surfaces in curved profiles.

16. The direct backlight module according to claim 14, wherein the top surface of the first refraction structure is a spherical surface, a cambered surface or a conical surface, and the top surface of the second refraction structure is a spherical surface, a cambered surface or a conical surface.

17. The direct backlight module according to claim 14, wherein the double lens structures are mounted on the back plate via a plurality of support legs, and satisfy a relation that H is greater than H3 and less than 4/3*H3, where H is the height of the support leg and H3 is the thickness of the LED bar.

18. The direct backlight module according to claim 14, wherein the top surface of the first refraction structure is a conical surface and the conical surface has a cone angle Φ in a range of 120° to 165°.

19. The direct backlight module according to claim 14, wherein the first refraction structure has a refraction index no greater than that of the second refraction structure.

* * * * *